(12) United States Patent
Walz et al.

(10) Patent No.: US 9,093,948 B2
(45) Date of Patent: Jul. 28, 2015

(54) FLAT-ROOF MOUNTING SYSTEM FOR PHOTOVOLTAIC MODULES

(75) Inventors: Leo Walz, Freiburg (DE); Fabian Johner, Bickensohl (DE)

(73) Assignee: Creotecc GmbH, Freiburg (DE)

( * ) Notice: Subject to any disclaimer, the term of this patent is extended or adjusted under 35 U.S.C. 154(b) by 79 days.

(21) Appl. No.: 13/567,114

(22) Filed: Aug. 6, 2012

(65) Prior Publication Data

US 2013/0032208 A1     Feb. 7, 2013

(30) Foreign Application Priority Data

Aug. 4, 2011  (DE) .......................... 10 2011 109 772

(51) Int. Cl.
*H01L 31/0203*  (2014.01)
*H01L 31/048*   (2014.01)
*H02S 20/24*    (2014.01)

(52) U.S. Cl.
CPC . *H02S 20/24* (2014.12); *Y02B 10/12* (2013.01)

(58) Field of Classification Search
CPC ............................... H02S 20/24; Y02B 10/12
USPC ........... 52/84, 91.3, 173.3; 136/243, 244, 251
See application file for complete search history.

(56) References Cited

U.S. PATENT DOCUMENTS

| | | | | |
|---|---|---|---|---|
| 1,085,474 A | * | 1/1914 | Peterson | 52/15 |
| 2,270,537 A | * | 1/1942 | Ludington | 52/173.1 |
| D243,185 S | * | 1/1977 | Parker et al. | D13/102 |
| 4,005,557 A | * | 2/1977 | Kramer et al. | 52/173.1 |
| 4,020,827 A | * | 5/1977 | Broberg | 126/696 |
| 4,665,667 A | * | 5/1987 | Taylor et al. | 52/96 |
| 5,746,839 A | * | 5/1998 | Dinwoodie | 136/251 |
| 5,951,785 A | * | 9/1999 | Uchihashi et al. | 136/251 |
| 6,534,703 B2 | * | 3/2003 | Dinwoodie | 136/251 |
| 6,606,828 B1 | * | 8/2003 | Lin et al. | 52/58 |

(Continued)

FOREIGN PATENT DOCUMENTS

| | | |
|---|---|---|
| DE | 20 2008 014 274 U1 | 3/2009 |
| DE | 20 2009 018 151 U1 | 5/2011 |

(Continued)

OTHER PUBLICATIONS

English translation of German Examination Report in corresponding patent application DE 10 2011 109 772.8 mailed Apr. 12, 2012 (5 pages).*

(Continued)

*Primary Examiner* — Rodney Mintz
(74) *Attorney, Agent, or Firm* — Renner, Otto, Boisselle & Sklar, LLP

(57) ABSTRACT

A mounting system for positioning at least one photovoltaic module of a PV-module unit on a planar flat roof in an inclined position defining an angle with the flat roof, comprising: a frame, wherein the frame defines a PV-module unit mounting side, a back side, two lateral sides, and a bottom side, which commonly define a prism, the base area of which corresponds to one of the lateral sides, the cover area of which corresponds to the other one of the lateral sides, and a jacket area of which corresponds to the mounting side, the back side and the bottom side. The mounting and back sides intersect along an imaginary line which defines a ridge arranged oppositely to the bottom side. A wind deflector may be attached to the back side such that an open ridge gap is formed and connects an interior of the prism to the environment.

13 Claims, 5 Drawing Sheets

(56) References Cited

U.S. PATENT DOCUMENTS

| | | | |
|---|---|---|---|
| 6,809,251 B2 * | 10/2004 | Dinwoodie | 136/251 |
| 6,809,253 B2 * | 10/2004 | Dinwoodie | 136/251 |
| D510,315 S * | 10/2005 | Shugar et al. | D13/102 |
| RE38,988 E * | 2/2006 | Dinwoodie | 136/251 |
| D516,017 S * | 2/2006 | Mascolo | D13/102 |
| D519,444 S * | 4/2006 | Mascolo | D13/102 |
| 7,587,867 B2 * | 9/2009 | Weber | 52/202 |
| 7,921,843 B1 * | 4/2011 | Rawlings | 126/623 |
| 7,956,281 B2 * | 6/2011 | O'Brien et al. | 136/251 |
| 8,234,824 B2 * | 8/2012 | Botkin et al. | 52/173.3 |
| 8,448,391 B2 * | 5/2013 | Botkin et al. | 52/173.3 |
| 8,487,180 B1 * | 7/2013 | Fraas et al. | 136/246 |
| 8,505,248 B1 * | 8/2013 | Leong et al. | 52/173.3 |
| 8,558,101 B2 * | 10/2013 | Mascolo et al. | 136/243 |
| 8,572,909 B2 * | 11/2013 | Rivera et al. | 52/173.3 |
| 8,590,224 B2 * | 11/2013 | Rummens | 52/173.3 |
| 8,635,818 B2 * | 1/2014 | Wildes | 52/173.3 |
| 8,661,748 B2 * | 3/2014 | Lewenz et al. | 52/173.3 |
| 8,672,702 B2 * | 3/2014 | Bragagna et al. | 439/415 |
| 8,748,733 B2 * | 6/2014 | Leary | 136/251 |
| 8,763,316 B2 * | 7/2014 | Concho et al. | 52/84 |
| 8,829,330 B2 * | 9/2014 | Meyer et al. | 136/246 |
| 2003/0010374 A1 * | 1/2003 | Dinwoodie | 136/251 |
| 2004/0007260 A1 * | 1/2004 | Dinwoodie | 136/251 |
| 2005/0126621 A1 * | 6/2005 | Dinwoodie et al. | 136/251 |
| 2006/0016130 A1 * | 1/2006 | Lin | 52/24 |
| 2007/0113489 A1 * | 5/2007 | Kaiser et al. | |
| 2007/0144575 A1 * | 6/2007 | Mascolo et al. | 136/246 |
| 2007/0151594 A1 * | 7/2007 | Mascolo et al. | 136/245 |
| 2009/0211625 A1 * | 8/2009 | Schwarze | 136/251 |
| 2009/0242014 A1 * | 10/2009 | Leary | 136/251 |
| 2009/0266352 A1 * | 10/2009 | Wetmore | 126/571 |
| 2010/0043781 A1 * | 2/2010 | Jones et al. | 126/704 |
| 2010/0089390 A1 * | 4/2010 | Miros et al. | 126/608 |
| 2010/0186320 A1 * | 7/2010 | Hoeft et al. | 52/173.3 |
| 2010/0212720 A1 * | 8/2010 | Meyer et al. | 136/246 |
| 2010/0243023 A1 * | 9/2010 | Patton et al. | 136/244 |
| 2011/0023390 A1 * | 2/2011 | Kneip et al. | 52/173.3 |
| 2011/0041429 A1 * | 2/2011 | Rummens et al. | 52/173.3 |
| 2011/0226312 A1 * | 9/2011 | Bohm et al. | 136/251 |
| 2011/0277400 A1 | 11/2011 | Kosslinger et al. | |
| 2011/0278411 A1 * | 11/2011 | Carbonare et al. | 248/237 |
| 2012/0036799 A1 * | 2/2012 | Kneip et al. | 52/173.3 |
| 2012/0048345 A1 * | 3/2012 | Wood et al. | 136/251 |
| 2012/0137602 A1 * | 6/2012 | Sager et al. | 52/173.3 |
| 2012/0186632 A1 * | 7/2012 | Reinhold et al. | 136/251 |
| 2012/0204935 A1 * | 8/2012 | Meyer et al. | 136/246 |
| 2012/0273029 A1 * | 11/2012 | Bragagna et al. | 136/251 |
| 2013/0000219 A1 * | 1/2013 | Kudav et al. | 52/84 |
| 2013/0112248 A1 * | 5/2013 | McPheeters | 136/251 |
| 2013/0192587 A1 * | 8/2013 | Lewenz et al. | 126/623 |
| 2013/0205692 A1 * | 8/2013 | Hubbard et al. | 52/173.3 |
| 2013/0255167 A1 * | 10/2013 | Concho et al. | 52/84 |
| 2013/0298968 A1 * | 11/2013 | Laitila et al. | 136/251 |
| 2013/0312812 A1 * | 11/2013 | Meyer et al. | 136/246 |
| 2014/0083488 A1 * | 3/2014 | Song et al. | 136/251 |
| 2014/0311054 A1 * | 10/2014 | Concho et al. | 52/84 |
| 2014/0311550 A1 * | 10/2014 | Pearce | 136/246 |

FOREIGN PATENT DOCUMENTS

| | | |
|---|---|---|
| DE | 20 2010 000 557 U1 | 6/2011 |
| DE | 102009056337 A1 | 6/2011 |
| DE | 102010061691 A1 | 7/2011 |
| DE | 20 2010 008 691 U1 | 12/2011 |
| DE | 20 2012 005 673 U1 | 8/2012 |
| EP | 2555254 A3 * | 2/2014 |
| JP | 2013093377 A * | 5/2013 |

OTHER PUBLICATIONS

German Examination Report in corresponding patent application DE 10 2011 109 772.8 mailed Apr. 12, 2012.

European Search Report for corresponding European patent application No. 12178773.3 dated Jan. 16, 2014.

* cited by examiner

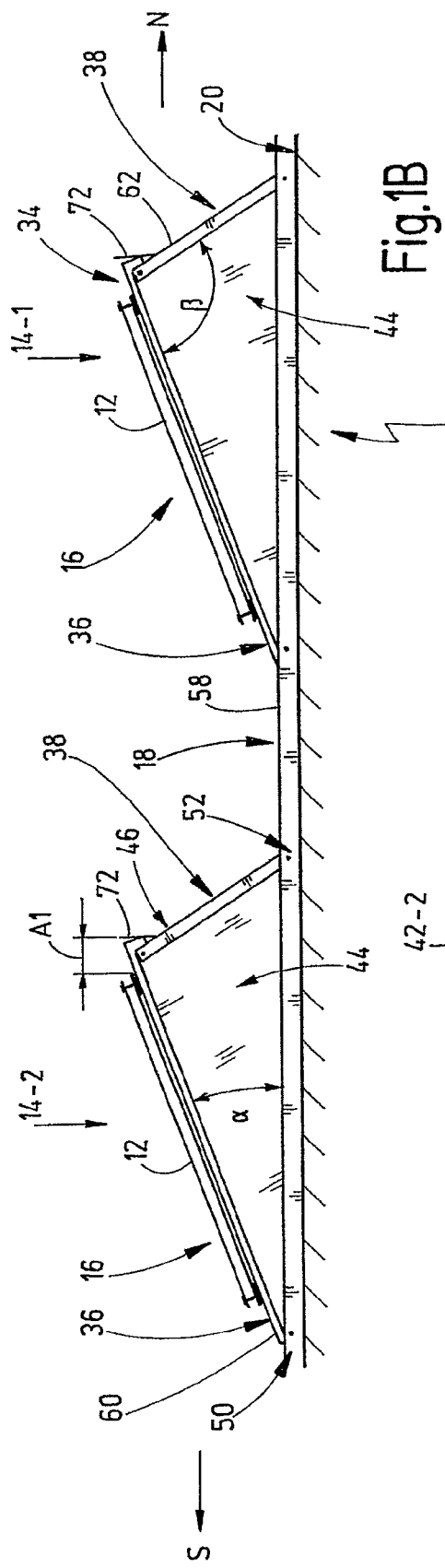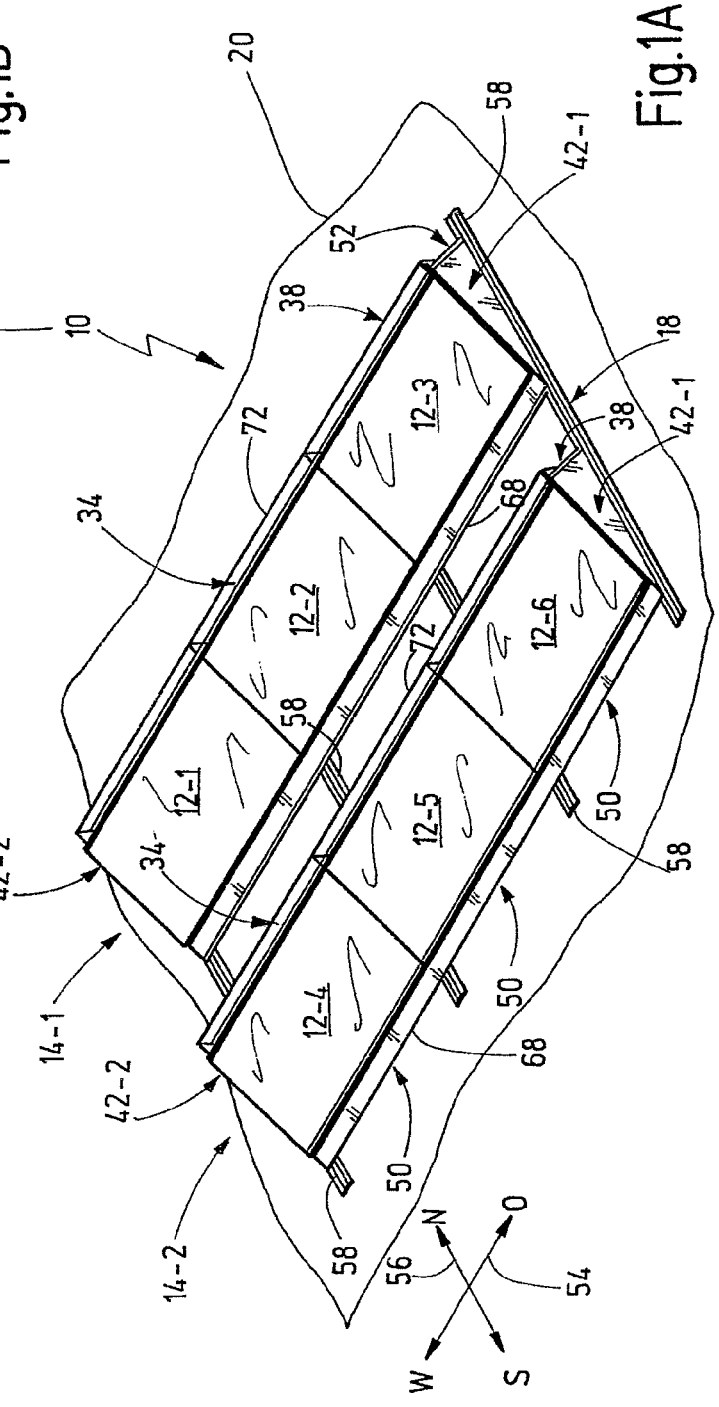

FLAT-ROOF MOUNTING SYSTEM FOR PHOTOVOLTAIC MODULES

CROSS REFERENCE TO RELATED APPLICATIONS

The present application claims the priority under the Paris Convention of the German patent application DE 10 2011 109 772.8 filed on Aug. 4, 2011. The entire content of this application is incorporated herewith by reference.

BACKGROUND OF THE INVENTION

The present invention relates to a mounting system for positioning at least one photovoltaic module (hereinafter also designated briefly as "PV module") of a PV-module unit on a planar flat roof in a position defining an angle (alpha) with the flat roof.

RELATED PRIOR ART

Conventional flat-roof mounting systems exist which are open laterally and to the back, wherein a baffle plate is positioned behind the system, perpendicular to the roof, for avoiding wind from reaching below the PV module, which is blowing from the direction of the back side. These systems are laterally open.

Further, systems exist which are formed in an apron-like shape and which are guided around the mounting system from behind, similar to a covering of a wedge which is open at its back side.

Even further systems exist which comprise a ridge gap. Ridge gaps are formed so that the corresponding mounting systems generate a subpressure beneath the PV modules, if the wind blows from the south. As soon as the wind blows from a slightly different direction, particularly from the north, an aerodynamic effect no longer exists.

Other system manufacturers cope with the lifting problems by providing the mounting frames with additional ballast. Additional ballast is disadvantageous, because many (elder) flat-roof constructions merely comprise a limited area-load capacity, which does not support correspondingly heavy or loaded mounting systems.

SUMMARY OF THE INVENTION

Therefore, it is an object of the present invention to provide a mounting system which presses the PV module and the system onto the flat roof in a wind-direction independent manner by means of aerodynamic effects, without providing additional ballast to the mounting system.

This object is solved according to a first aspect of the invention by a mounting system for positioning of at least one photovoltaic (PV) module of a PV-module unit on a planar flat roof in an inclined position defining an angle Alpha with the flat roof, comprising: a frame, wherein the frame defines a PV-module unit mounting side, a back side, two lateral sides, and a bottom side, which commonly define a prism, the base area of which corresponds to one of the lateral sides, the cover area of which corresponds to the other lateral side, and the jacket area of which corresponds to the mounting side, the back side and the bottom side, wherein the mounting side and the back side enclose an angle Beta, which is preferably obtuse, wherein the mounting side and the back side intersect along an imaginary line of intersection, which defines a ridge arranged oppositely to the bottom side, and wherein the bottom side is arranged oppositely to the flat roof in an installed state of the mounting system; a side-covering for each of the lateral sides wherein each of the side-coverings covers the associated lateral side; a wind deflector attached to the back side and covering the back side; wherein an open ridge gap is formed in a region of the ridge between the wind deflector and the PV-module unit, if the PV-module unit is attached to the mounting side, which connects an interior of the prism to an outer environment of the prism, wherein a perpendicular projection of the ridge gap onto the flat roof defines a first area; wherein a first open foot gap is formed in a lower region of the mounting side between the flat roof and the attached PV-module unit and/or wherein a second foot gap is formed in a lower region of the back side between the flat roof and the wind deflector, wherein a perpendicular projection of each of the foot gaps onto a first imaginary plane, which is oriented perpendicular to the flat roof, respectively defines a second area; wherein the first area is at least as great as a sum of all of the second areas; and wherein an upper edge of the wind deflector and an upper edge of the PV-module unit are arranged in a second imaginary plane oriented parallel relative to the flat roof.

According to another aspect of the invention it is disclosed a mounting system for installing and positioning a photovoltaic (PV)-module unit on a planar flat roof in an inclined position defining an angle Alpha with the flat roof, wherein the PV-module unit has an upper edge and comprises at least one PV module, the system comprising: a frame, wherein the frame comprises: a PV-module unit mounting side; a back side; lateral sides; and a bottom side; the sides of the frame commonly defining a prism having an interior, a base area, a cover area, and a jacket area; the base area corresponding to one of the lateral sides, the cover area corresponding to another one of the lateral sides, and the jacket area corresponding to the mounting side, the back side and the bottom side; wherein the mounting side and the back side enclose an angle Beta; wherein the mounting side and the back side intersect along an imaginary line of intersection, which defines a ridge being arranged oppositely to the bottom side; and wherein the bottom side is arranged, in an installed state of the mounting system, oppositely to the flat roof; a side-covering for each of the lateral sides, wherein each of the side-coverings covers an associated one of the lateral sides; a wind deflector attached to the back side and covering the back side, wherein the wind deflector comprises an upper edge; wherein in a region of the ridge between the wind deflector and the PV-module unit, if the PV-module unit is attached to the mounting side, an open ridge gap is formed connecting the interior of the prism to an outer environment of the prism, wherein a perpendicular projection of the ridge gap onto the flat roof defines a first area; wherein at least one of: a first open foot gap in a lower region of the mounting side between the flat roof and the attached PV module unit, and a second open foot gap in a lower region of the back side between the flat roof and the wind deflector is formed; wherein a perpendicular projection of each of the foot gaps onto a first imaginary plane, which is oriented perpendicular to the flat roof, respectively defines a second area; wherein the first area is at least as great as a sum of the second areas; and wherein the upper edge of the wind deflector and the upper edge of the PV module unit are arranged in a second imaginary plane, which is oriented parallel to the flat roof.

The mounting system of the invention is operated in accordance with the principle of a water jet, i.e., the invention utilizes the Venturi effect which is also responsible, for example, for the mode of operation of a water-jet vacuum pump. The volume beneath the PV module is sealed almost air tight in all directions, with the exception of (vertical) foot gaps, if present, and one bigger (horizontal) ridge gap. If wind strikes over the module, in particular independent from which direction, a suction effect is generated pressing the PV module on the flat roof instead of lifting the PV module. The limiting edges of the ridge gap are formed so that the wind cannot blow beneath the PV module from any direction. Hence, the mounting system of the invention works almost independently of the wind direction. Only a very small wind-direction range around the east-west direction provides a smaller suction effect.

A particular advantage was found when the upper edges of the elements, which are arranged in the region of the ridge gap, are arranged in a plane parallel to the plane of the roof on which the mounting system is errected. This condition is responsible, amongst other things, for the wind-direction independency of the mounting system of the invention.

Preferably, the wind deflector comprises a cover area, and particularly a spoiler having a spoiler area, wherein the spoiler area is arranged adjacent to the cover area and oriented in an angle relative to the back side so that the spoiler area protrudes from the back side.

Like in motor sports, the spoiler influences the stream of air striking over the erected and covered mounting system. Since the mounting system is preferably designed in a modular manner the spoiler can be bended at site, i.e., at the construction site, so that the upper edges of the elements defining the ridge gap are arranged in the same plane. Alternatively, elements of the mounting system in accordance with the invention can be stocked-up according to a modular principle, namely in dependence of, for example, inclination angles α and/or the length of the PV modules.

Another advantage is to be seen in the spoiler area in the installed state of the mounting systems being oriented substantially perpendicular relative to the flat roof.

In this case, the spoiler area defines a lateral limitation of the projection of the ridge gap. The wind cannot reach behind the spoiler so that lifting effects are reduced or are not present.

With another preferred embodiment the lateral sides are substantially triangular in shape.

If triangular lateral sides are used, the mounting side, the bottom side and the back side are respectively limited laterally by means of a straight line. This facilitates the set-up of the system. It is clear that, alternatively, lateral sides having a plurality of corners can also be used, for example, for adapting the lateral contour of the mounting side to a desired curved course (e.g., section of an aircraft wing).

With another advantageous embodiment the lateral sides are orientated parallel to each other.

In this case, the wind resistance is reduced if the wind blows from the preferred direction (from the south or from the north). The least material is required for manufacturing the side-covering.

With another particular embodiment the bottom side is open.

In this case, the mounting frame, which is open towards the bottom, is put or laid simply on the roof in an assembled state. Then the roof covers the bottom side. In this manner covering material can be saved.

With another particular embodiment the frame comprises a module-support section, a set-up section, and/or a base section. These sections can be formed integrally.

Here, the idea of the modular concept is implemented. The sections can be pre-mounted and folded for being set-up and unfolded subsequently at the construction site by simple folding movements. In this manner it is possible to prepare the mounting system for set-up and transporting same in a compact manner to the construction site. Further, sections having different lengths can be stocked, allowing application of different PV modules. Typically, the PV-module type is selected by the customer. Then the worker at the construction site does not have to think, but only takes elements which have been pre-mass-produced, in order to setup the desired mounting system.

Preferably, the PV-module unit comprises at least one PV module, and/or at least one module-support section.

In particular, the module unit can comprise at least one adapter plate attachable to the frame at the mounting side between the at least one PV module and the flat roof, and/or between the at least one PV module and the ridge gap.

Also in this case the modular concept is implemented. In dependence on a selected PV-module type (length) adapter plates can be used, if required, for covering the mounting side of the frame and leaving open merely a foot gap, if desired.

Further, it is advantageous if the gaps are arranged parallel to each other.

With another preferred embodiment the side-coverings and the wind deflector cover surfaces (substantially air tight) which are associated therewith.

It is clear the above-mentioned and hereinafter still to be explained features cannot only be used in the respectively given combination but also in other combinations or alone without leaving the scope of the present invention.

BRIEF DESCRIPTION OF THE DRAWINGS

Embodiments of the invention are illustrated in the drawings and will be explained in more detail in the following description, wherein.

DESCRIPTION OF PREFERRED EMBODIMENTS

Figure 1C:
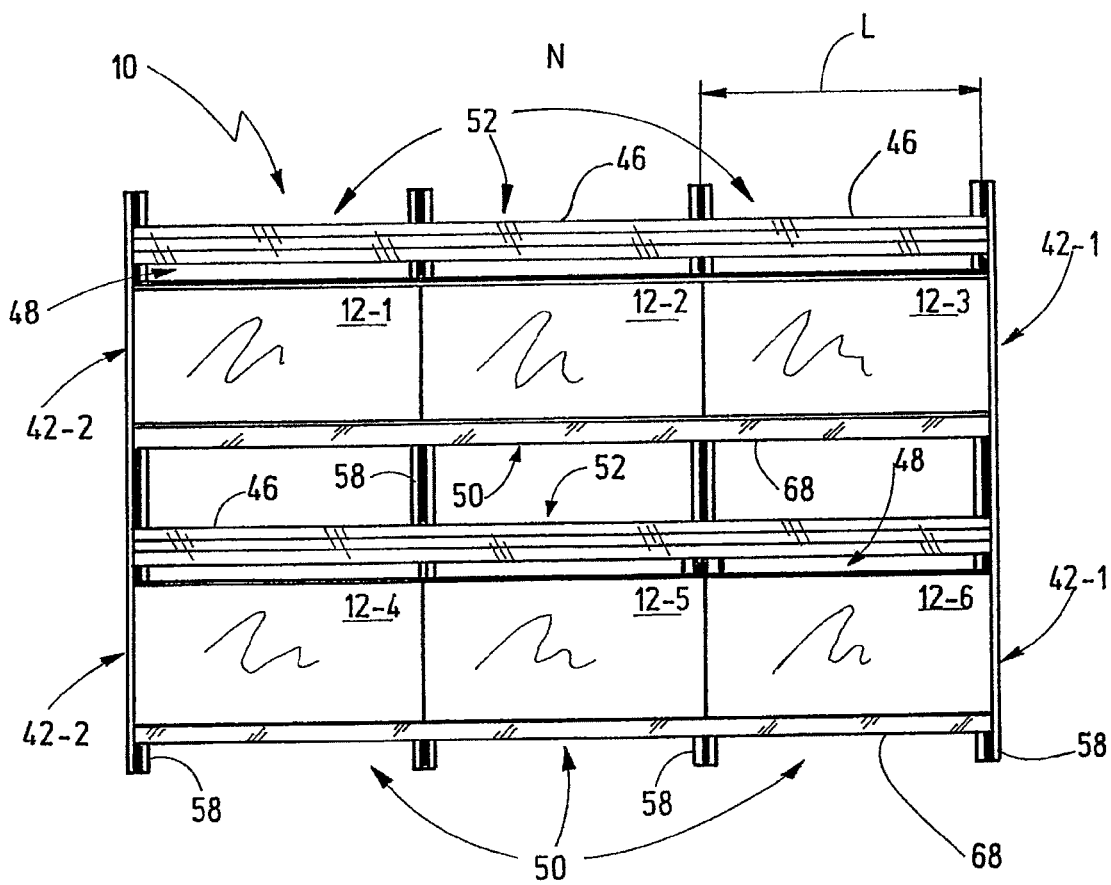
FIG. 1 shows different views (FIG. 1A-1C) of a mounting system in accordance with the invention formed of multiple modules.
Figure 2:
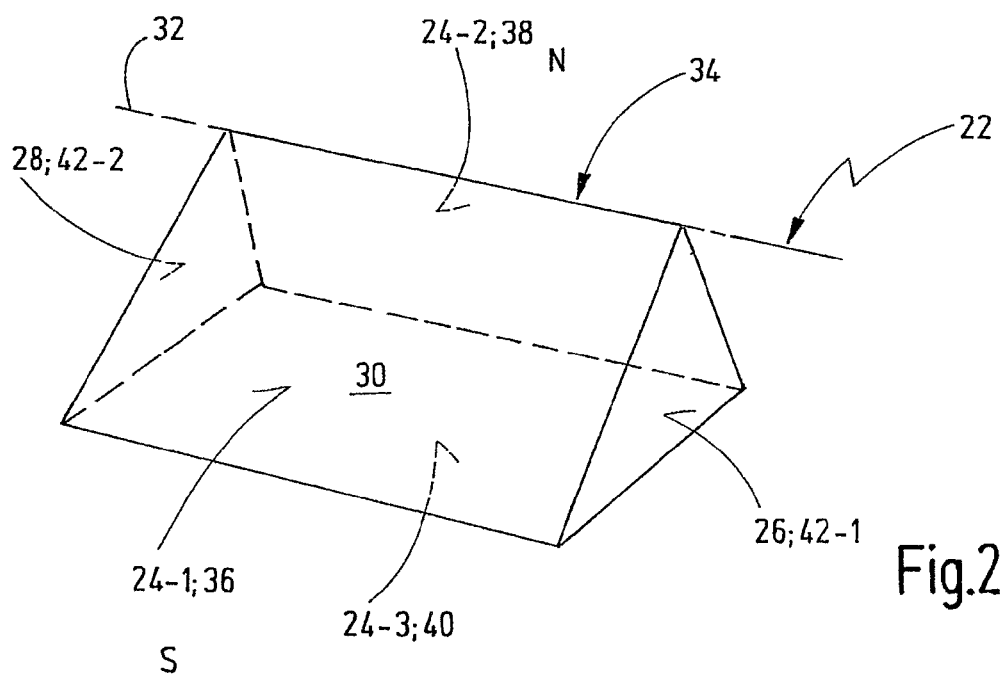
FIG. 2 shows a perspective view of a prism having triangular base and cover areas.

The present invention relates to a mounting system 10 which will be described hereinafter with common reference to the FIG. 1A to FIG. 1C in combination with FIG. 2. FIG. 1A shows a perspective view of the mounting system 10, when viewed obliquely from above. FIG. 1B shows a side view of the mounting system 10 of FIG. 1A along an east-west direction. FIG. 1C shows a top view on the mounting system 10 of the FIGS. 1A and 1B in a north-south direction. FIG. 2 shows a possible base shape of the mounting system 10 of FIG. 1 in terms of a prism. A prism is a geometrical body having a multi-cornered base area, the side edges of the body being parallel and typically having the same length. A prism is generated by parallel displacement of a polygon along a straight line in space, which does not lie in this plane, and therefore is a special polyhedron. Most of the prisms have a triangle as base and cover areas, as will be explained in more detail below. Other shapes are based, for example, on a square or a pentagon.

The mounting system 10 of FIG. 1 is designed for supporting at least one PV module 12, which can be provided with or without a frame. The mounting system 10 of FIG. 1 comprises, for example, six PV modules 12-1 to 12-6. The PV modules 12 can be arranged in arbitrarily many rows 14 side-by-side and/or one after the other. In FIG. 1A, for example, two rows 14-1 and 14-2 are shown behind each other. The first row 14-1 comprises the modules 12-1 to 12-3. The second row 14-2 comprises the modules 12-4 to 12-6. The modules 12-1 to 12-3 and 12-4 to 12-6 are arranged side-by-side in an east-west direction. The rows 14-1 and 14-2 extend parallel to each other. The rows 14-1 and 14-2 are distanced in a north-south direction so that a set-up area such as a (flat) roof 20 is used as optimal as possible, i.e., as many as possible PV modules 12 are placed on the roof 20, and so that wind-shadow effects due to neighboring PV modules are as small as possible.

The PV modules 12 are part of (presently two) PV-module units 16, which are indicated in FIG. 1B. The PV-module units 16 comprise additional elements apart of the PV modules 12, as will be explained in more detail below. The PV-module units 16 are fixed on, to, and/or in a frame 18, which is laid on the roof 20. Between the frame 18 and the roof 20 protecting (isolation) mats can be laid, which are not shown in FIG. 1. Usually, the roofs 20 are represented by so-called "flat roofs", i.e., roofs being substantially planar and not comprising steps or similar unevennesses. However, a stepped flat roof corresponds to a plurality of simple flat roofs arranged at different levels. Steps, landings and similar can be bridged in that the base sections 58 are connected, for example, by means of connecting elements (not shown) if the base sections are laid at different height levels one after the other. In this case, the connecting elements are correspondingly shaped, for example, in the shape of an L-shaped or S-shaped angle. The frame 18 substantially serves for setting up the PV modules 12 relative to a horizontal line with a set-up angle alpha (cf. FIG. 1B) for maximizing the degree of effect of the current generating elements of the PV module 12. In Europe, the inclination angle alpha is in a range between 10° and 25°, and depends on the geographical degree of latitude.

The frame 18 comprises the (geometrical) shape of a prism. A prism 22 is indicated in a perspective view in FIG. 2. The prism 22 comprises adjacent jacket areas 24, a base area 26, and a cover area 28. The base and cover areas 26 and 28 are typically congruent and, for example, have a triangular shape. The jacket areas 24 enclose together with the base area 26 and the cover area 28 a (closed) volume 30 of the prism 22. The volume 30 will also be designated subsequently as an "interior" of the prism 22 and the frame 18.

In an upper region of the prism 22 of FIG. 2 a line (of intersection) 32 is shown, which defines a ridge 34. The ridge 34 is arranged in a region where a mounting side 36 and a back side 38 of the frame 18 intersect. The frame 18 substantially defines the edges of the prism 22 of FIG. 2. The mounting side 36 of the frame 18 corresponds to a first jacket area 24-1 of the prism 22. A jacket area 24-2 of the prism 22 corresponds to the back side 38 of the frame 18. A jacket area 24-3 of the prism 22, being depicted the last in FIG. 2 corresponds to a bottom side 40 of the frame 18. The base and cover areas 26 and 28 of the prism 22 correspond to lateral sides 42-1 and 42-2 (cf. FIG. 1A) of the frame 18.

The PV modules 12 or the PV-module units 16 are mounted along the mounting side 36 of the frame 18. The mounting side 36 is substantially covered by the PV-module unit 16.

The mounting side 36 can be formed open only in a foot region of a front edge of the mounting side 36. Side-coverings 44 are attached, preferably air-tight, to the lateral sides 42 of the frame 18, as will be explained in greater detail below. A wind deflector 46 is attached to the back side 38, the wind deflector having the functionality of a (car) spoiler, as will also be explained in more detail below. A ridge gap 48 extends between the mounting side 36 and the back side 38, or between the PV-module unit 16 and the wind deflector 46 in a transverse direction of the frame 18, which is oriented parallel to the east-west orientation 54 (cf. FIG. 1A) in FIG. 1, wherein the ridge gap 48 can be recognized particularly good in the top view of FIG. 1C. The ridge gap 48 comprises a substantially rectangular (projected) area A1, as will be explained hereinafter with reference to FIG. 4B and FIG. 5 in more detail. The ridge gap 48 can be formed by a number of individual ridge gaps, as shown in FIG. 1C. Two ridge gaps 48 are shown in FIG. 1C, which extend between the modules 12-1 to 12-3 and 12-4 to 12-6 as well as the respectively associated wind deflector 46 in terms of respectively three individual ridge gaps being arranged side-by-side. The ridge gaps 48 are actually formed of respectively three individual ridge gaps, wherein respectively one individual ridge gap is associated with one of the PV modules 12-1 to 12-3 or 12-4 to 12-6.

The bottom side 40 of the frame 18 of the mounting system 10 typically is open, i.e., not covered. The bottom side 40 is covered by the roof 20 in a set-up state of the mounting system 10. The mounting system 10, in this sense, is merely laid on the roof 20 and does not need to be cased additionally. Also, the mounting system 10 of the invention does not require additional ballast, contrary to many conventional mounting systems, i.e., does not need to be equipped with additional weights for holding the mounting system 10 on the roof, in particular with winds from unfavorable directions which may cause lifting of the PV modules 12 from the frame 18, or lifting of the entire frame 18.

Figure 3:
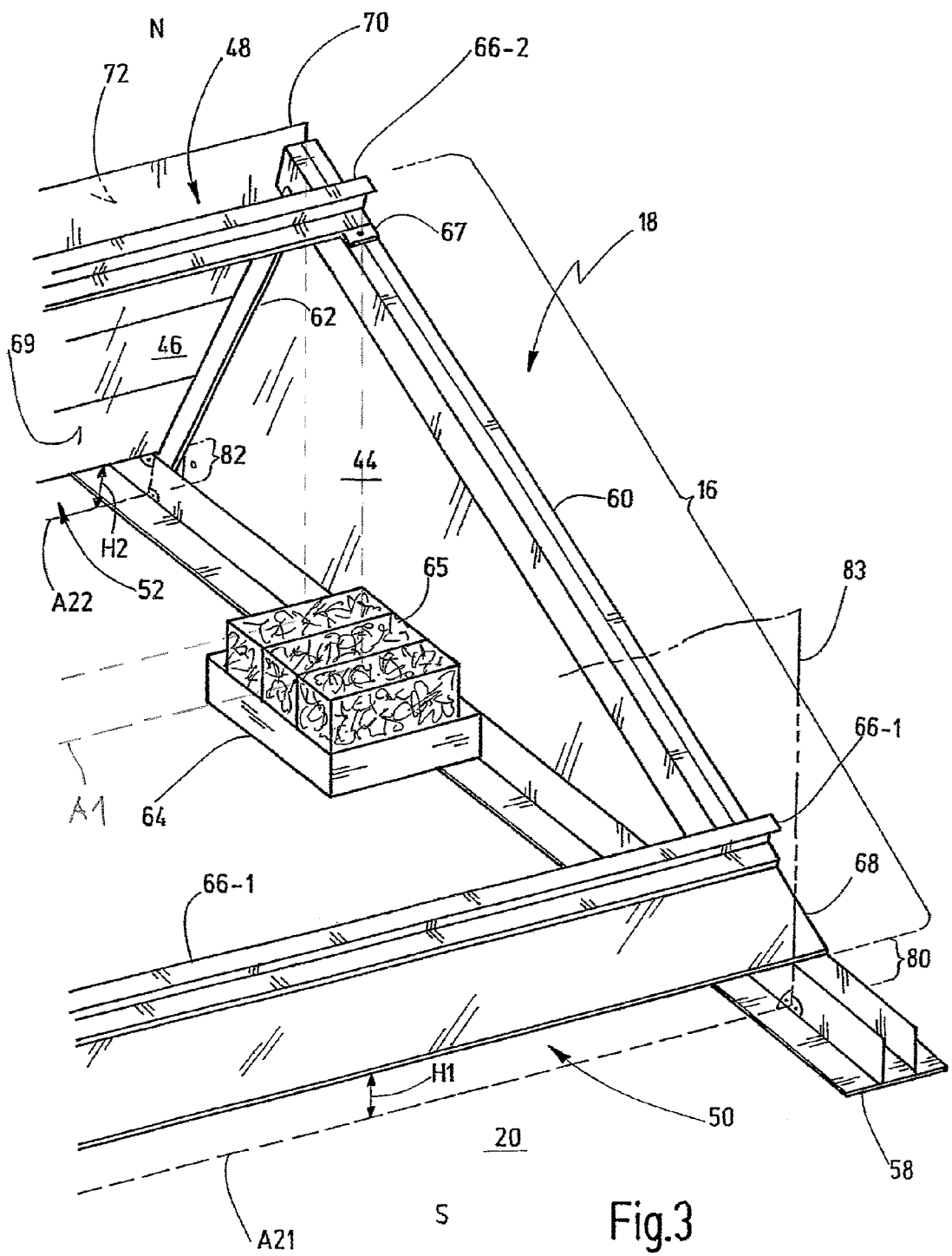
FIG. 3 shows a perspective view of a part of another mounting system in accordance with the invention.

Additional ballast is shown in FIG. 3. FIG. 3 shows the frame 18 of FIG. 1 partially in a state when the PV module 12 is removed so that one can see the interior 30. FIG. 3 also serves for illustrating a first foot gap 50 and a second foot gap 52. The first foot gap 50 extends between the roof 20 and the PV-module unit 16. The second foot gap 52 extends between wind deflector 46 and the roof 20. The first foot gap 50 has, for example, a rectangular area A21. The second foot gap 52 comprises a height H2 which preferably equals the height H1 of the first foot gap 50, and also comprises an area A22 being formed rectangularly. The foot gaps 50 and 52 connect the interior 30 of the frame 18 to an outer environment. Air can stream into the interior 30 through the foot gap 50, provided that the wind blows from the right direction, preferably from the north-south direction being designated by 56 in FIG. 1A. The foot gaps 50 and 52 substantially extend parallel to the ridge gap 48.

The wind deflector 46 effects that the ridge gap 48 acts as a nozzle as exemplarily used with water-jet vacuum pumps. Back-side cooling of the PV modules 12 is an additional effect. Air flows from the foot gaps 50 and 52 towards the ridge gap 48, in particular in dependence on the wind direction. Air is sucked from the interior 30 at the ridge gap 48 as soon as the wind strikes over the mounting system 10 (including the PV modules 12).

The frame 18 being depicted exemplarily in FIG. 3 comprises in general a base section 58, a module-support section 60 as well as a set-up section 62 representing edges of the base and cover areas. The frame 18 can also comprise ballast receipts 64, into which, for example, stones 65 can be given for weighing down the frame 18 additionally. The base section 58 comprises, for example, a cross section having the shape of a double T, and serves for receiving the support section 60 (in a foldable manner). The inclination angle α (cf. FIG. 1B) is defined between the support section 60 and the base section 58, which is laid on the roof 20. The support section 60 can be connected pivotally to the base section 58 by means of a screw (which is not shown here). The support section 60 can be pre-assembled with the base section 58. In the preassembled state, the support section 60 can be received by section legs protruding from the base section 58 in a U-shape. In this state, the support section 60 lies in the base section 58 and is pivoted at the construction side around the screw which is not shown here. Arbitrary inclination angles α can be set.

The set-up section 62 and the base section 58 or the support section 60 can be connected to each other and/or pre-assembled in a similar manner. This type of pre-assembly is advantageous in that the frame 18 can be delivered in a pre-mass-produced manner, and the mounting at the construction side requires only a flick of the wrist. The support section 60 and the set-up section 62 enclose an angle β (cf. also FIG. 1B) in an assembled state, which preferably is obtuse for avoiding that wind from the north N can enter beneath the mounting system 10.

It is clear that the length of the sections 58, 60, and 62 can vary. For example, an individual base section 58 can be used for mounting several rows 14 one after the other (cf. FIG. 1A). The angles α and β can be selected and prepared for the length of the sections 60 and 62. The length of the sections 60 substantially depends on the length of the used PV module 12.

In FIG. 3 components of the PV-module unit 16 can be recognized well. The PV-module unit 16 can comprise, beside the at least one PV module 12 not shown here, one or more module-support sections 66 which are preferably connected to the frame 18 in the transverse direction (east-west direction) in FIG. 1. The applicant sells a PV-module insertion system having support sections 66 of the type shown in FIGS. 3 and 4B under the name "AluTecc". The support sections 66 can be fixed to the module-support sections 60, for example, by means of clamps 67.

The PV-module unit 16 can comprise additionally one or more adapter plates 68 which are provided adjacently above or below to the PV module 12 and/or the support sections 66. One adapter plate 68 is exemplarily shown in FIG. 3 being adjacent, preferably in an air-tight manner, to the lower support section 66-1. The lower support section 66-1 can be formed integrally with the adapter plate 68. The adapter plate 68 can also be arranged adjacent to the upper support section 66-2 at the ridge gap 48. Upper/or lower adapter plates 68 can be used. The adapter plates 68 can also be used if no support sections 66 are used. The adapter plates 68 serve for covering the mounting side 38 as tight as possible, with the exception of the first foot gap 50 and the ridge gap 48, for protecting the interior 30 of the frame 18 against feed and removal of air. The adapter plates 68 can have different lengths (north-south).

The wind deflector 46 of FIG. 3 comprises a cover area 69 to which a spoiler 70 having a spoiler area 72 is arranged adjacently. The cover area 69 extends along the back side 38 and substantially covers same. The cover area 69 is orientated parallel to the back side 38. The spoiler 70 having its spoiler area 72 protrudes from the back side 38, as will be explained in more detail with reference to FIG. 4B.

The first foot gap 50 and/or the second foot gap 52 are respectively arranged in lower regions 80 and 82 of the front side 36 or the back side 38. The first foot gap 50 and/or the second foot gap 52 can be sealed (in an air tight manner). The size of the areas A21 and A22 is determined by the product of the corresponding height H1 or H2 and a length L (cf. FIG. 1C) of the modules 12. The length L of the gap 50 or 52 can be varied by means of gap adapter plates (not shown), which are inserted (later) into the gap 50 or 52. The example explained so far comprises respectively an area of 3H×L with regard to both the first area A21 and the second are A22. The areas A21 and A22 are measured in an (imaginary) plane which is orientated perpendicular to the plane of the roof 20.

Figure 4A:
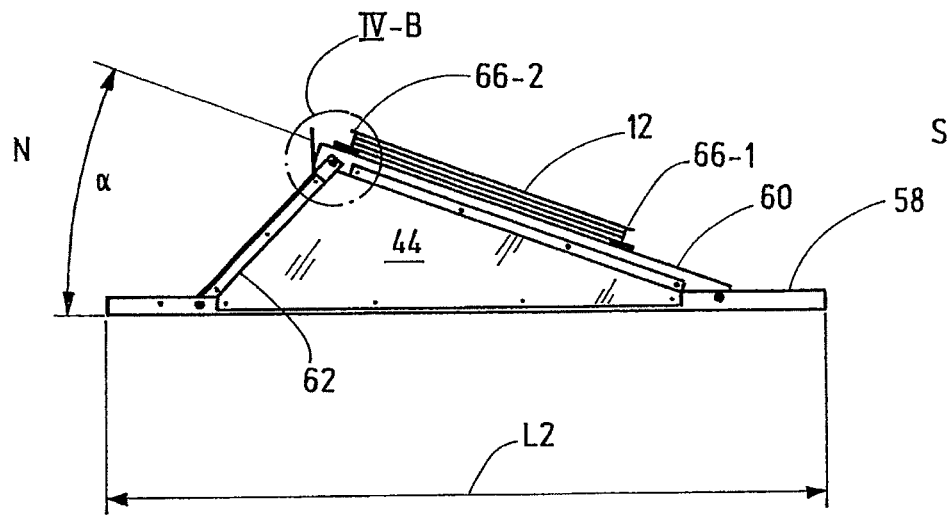
FIG. 4 shows a side view (FIG. 4A) of a mounting system in accordance with the invention and a detailed view (FIG. 4B) of a circle being designated by IV-B in FIG. 4A.
Figure 4B:
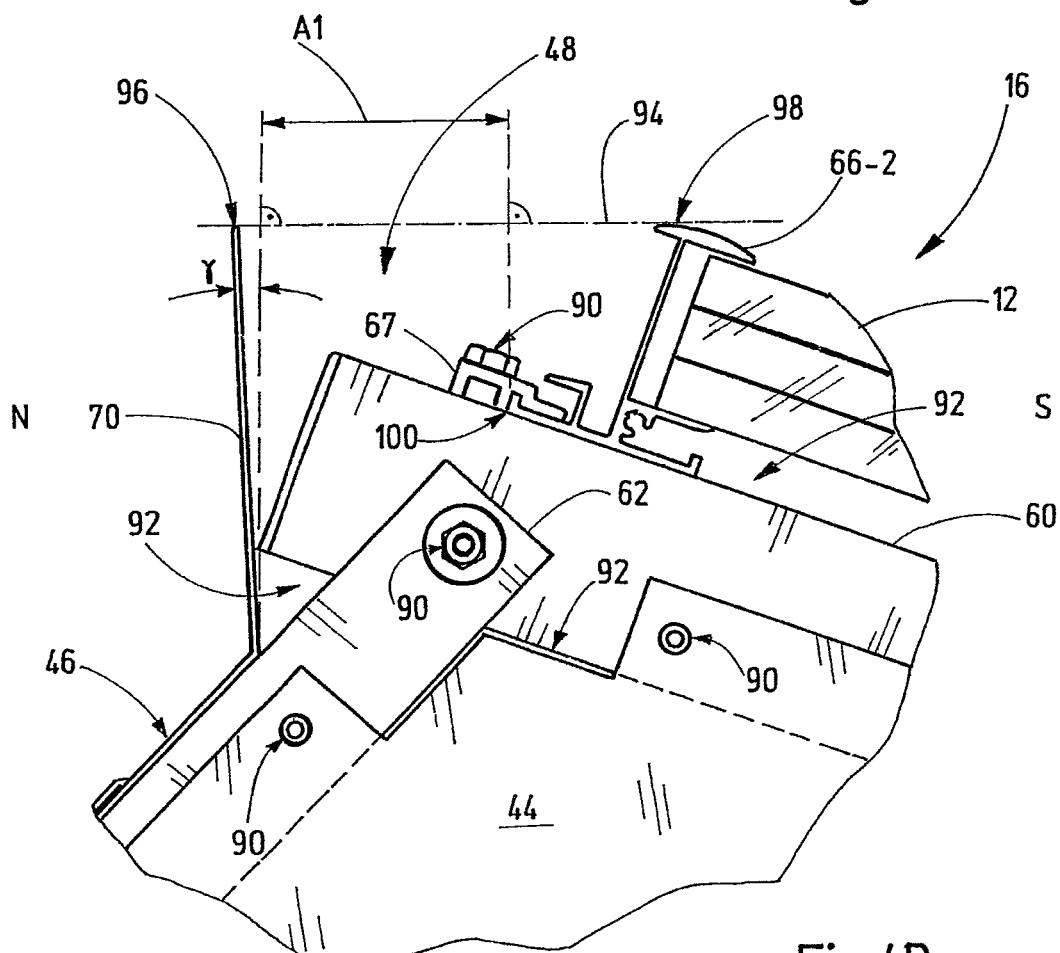

With reference to FIGS. 4A and 4B a frame row 14 and individual frame 18 are shown in a side view (FIG. 4A) and a detailed view (FIG. 4B), wherein the detailed view of FIG. 4B is indicated in FIG. 4A by means of a circle being designated by "IV-B". FIG. 4A shows a view from the west towards the east. In FIG. 4A the side-covering 44 can be recognized as well. The side-covering 44 covers the lateral side 42-2 as good as possible.

FIG. 4B shows that the side-covering 44 is connected to the sections 60 and 62 by means of screw connections 90 (screw-nut/screw-washer-nut). (Air) gaps 92 can be present between the sections 60 or 62 and the side-covering 44, however the gaps are negligible with regard to aerodynamics. In this sense, the side-covering 44 covers the lateral side 42 "substantially". Similar is true with regard to the wind deflector 46 and the PV-module unit 16 with regard to coverage of the back side 38 or the mounting side 36. Gaps 92 can also be present between the PV module 12 and the module-support section 60. The gaps 92 shown in FIG. 4B are only relevant if the wind blows from the east or the west over the mounting system 10. If this wind blows exactly from these directions—and thus possibly into the interior 30 of the frame 18—almost no aerodynamical effect exists, as will be explained in more detail in the context of FIG. 6.

The sections 60 and 62 can also be connected pivotally to each other by means of a screw connection 90. Similar is true for the fixation of the upper support section 66-2 to the section 60 through the clamp 67.

Further, a (horizontal) imaginary line 94 is shown in FIG. 4B which is orientated parallel to the roof 20 (not illustrated). The imaginary line 94 represents one of the base vectors of a plane extending parallel to the roof 20. An upper edge 96 of the spoiler 70 as well as an upper edge 98 of the PV-module unit 16 (here in terms of the upper support section 66-2) are arranged in this plane which is arranged parallel to the roof 20. The upper edges 96 and 98 define an opening mouth of the ridge gap 48, the projection of which extends between an upper edge 100 of the upper support section 66-2 and the spoiler 70. The roof ridge 48, or the area A1 thereof, is defined by a projection onto the roof 20 from a direction perpendicular to the roof 20. The area of the ridge gap 48 substantially corresponds to the product of the length L of one module 12 and a gap width extending between the two imaginary lines being depicted vertically in FIG. 4B. This product is multiplied by the number of PV modules 12 in one row 14 for calculating the entire area of the ridge gap 48.

The inventors have recognized that subpressure (suction) is established in the interior 30 of the frame 18, if the area A1 of the ridge gap 48 is greater than the sum of the areas A21 and A22 of the foot gaps 50 and 52. In this context it does not matter whether one, two, or no foot gap are provided. Under this circumstance the so-called Venturi effect happens. If wind strikes over the mounting system 10, preferably from the directions south or north, the subpressure becomes maximal and the modules 12 are loaded towards the roof 12. Instead of lifting the modules 12, the modules 12 are thus pressed on the roof 20 additionally. In this manner, additional ballast such as the stones 65 in FIG. 3 can be omitted. In this context, one speaks of no or low additional ballast of the mounting system 10.

The inventors have further recognized that the relative arrangement of the upper edges 96 and 98 in the plane 94 parallel to the roof results in advantages.

Figure 5:
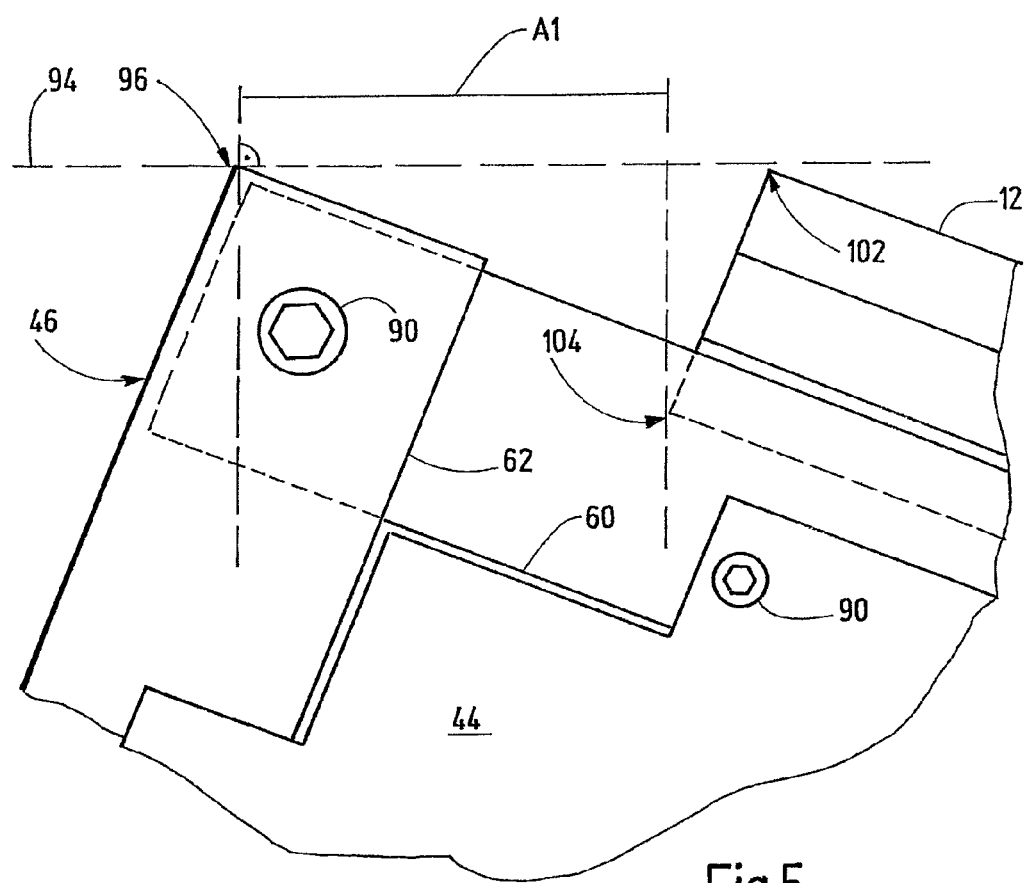
FIG. 5 shows a detailed view of a modified mounting system in accordance with the invention similar to FIG. 4B.

FIG. 5 shows a similar illustration like FIG. 4B. In FIG. 5 the wind deflector 46—without the spoiler 70—extends completely along the back side 38 which is defined by the section 62. Thus, in this sense no protruding spoiler area 72 is present. The upper edge 96 of the wind deflector 46 is defined by the cover area 69. Also, the upper edge 96 defines the outer margin of the perpendicular projection of the ridge gap 48 onto the roof 20. In FIG. 4B this outer margin was defined by a lower edge of the spoiler 70, which was not designated in more detail. The opposite edge of the projection is defined by an end edge 104 of the module 12. The module 12 of FIG. 1 substantially forms the PV-module unit 16. In this case, module-support sections 66 are not provided. The module 12 immerses into the mounting side 36. The end edge 104 of the module 12 defines an edge of the ridge gap 34 in the projection. However, in this context the upper edge 102 of the module 12 defines the position of the plane 94 extending parallel relative to the roof 20.

Figure 6:
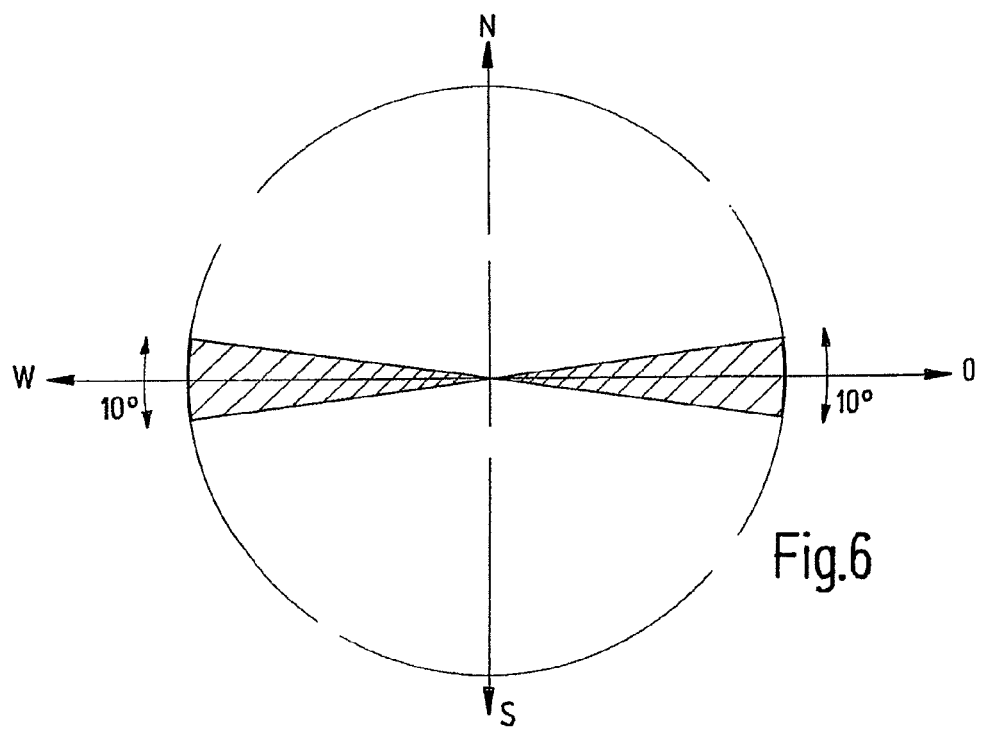
FIG. 6 shows a diagram for illustrating dependency of the aerodynamic effect on the incident direction of an air stream (wind).

FIG. 6 graphically shows the dependency of the suction effect generated by wind. If the wind blows from the north or the south, the subpressure in the interior of the frame 18 becomes maximal (white area inside the circle). If the wind blows from the east or the west, i.e., blows substantially parallel to the longitudinal extension of the ridge gap 48, the suction effect becomes minimal. This is indicated in FIG. 6 in terms of a hatched area pending around the east and west directions. Each of the triangular areas being depicted in a hatched manner comprises almost an opening angle of 10°.

In the above description of the figures the selection of orientations of the coordinate systems has been adapted to a north-south orientation (longitudinal direction of the mounting system 10) or an east-west orientation (transverse direction of the mounting system 10).

Further, like parts and features have been designated by like reference numerals. The disclosure contained in the description can be transferred roughly onto identical parts and features having the same reference numerals. Position and orientation indications (such as "above", "below", "lateral", "longitudinal", "transverse", "horizontal", "vertical" and the like) are related directly to the described figure. With a modification of the position or orientation these indications are to be transferred roughly, however, to the new position and orientation.

The term "substantially covered" is to be understood in that the corresponding sides of the prism 22 or the frame 18 do not need to be sealed absolutely air tight. Smaller gaps 92 may be present in the longitudinal or transverse direction as long as the corresponding sides and surfaces are covered predominantly.

It is clear that the foot gaps 50 and 52 do not necessarily need to be arranged adjacent to the roof 20. For example, it is also possible that the lower region 80 of the mounting side 36, which is immediately adjacent to the roof 20, is sealed almost air tight, and to define the first foot gap 50 between two adapter plates 68 which are arranged, for example, between the roof 20 and the lower support rail 66-1. Similar is true with regard to the second foot gap 52 at the back side 38 of the frames 18. If the planes of the foot gaps 50 and/or 52 lie parallel to the mounting side 30 and/or back side 38, then with determining the gap size (area) A21 and A22 the projection area is relevant, which is obtained if the gaps 50 and/or 52 are mapped onto one plane being orientated perpendicular to the plane of the roof 20. The gaps 48, 50, and 52 are orientated preferably parallel to each other.

What is claimed is:

1. A mounting system for installing and positioning a photovoltaic (PV)-module unit on a planar flat roof in an inclined position defining an angle Alpha with the flat roof, wherein the PV-module unit has an upper edge and comprises at least one PV module, the system comprising:
   a frame, wherein the frame comprises:
      a PV-module unit mounting side;
      a back side;
      lateral sides; and a
      bottom side;
      the sides of the frame commonly defining a prism having an interior, a base area, a cover area, and a jacket area; the base area corresponding to one of the lateral sides, the cover area corresponding to another one of the lateral sides, and the jacket area corresponding to the mounting side, the back side and the bottom side;
      wherein the mounting side and the back side enclose an angle Beta; wherein the mounting side and the back side intersect along an imaginary line of intersection, which defines a ridge being arranged oppositely to the bottom side; and
   wherein the bottom side is arranged, in an installed state of the mounting system, oppositely to the flat roof;
   a side-covering for each of the lateral sides, wherein each of the side-coverings covers an associated one of the lateral sides;
   a wind deflector attached to the back side and covering the back side, wherein the wind deflector comprises an upper edge;
   wherein in a region of the ridge between the wind deflector and the PV-module unit, when the PV-module unit is attached to the mounting side, an open ridge gap is formed connecting the interior of the prism to an outer environment of the prism, wherein a perpendicular projection of the ridge gap onto the flat roof defines a first area;
   wherein at least one of: a first open foot gap in a lower region of the mounting side between the flat roof and the attached PV module unit, and a second open foot gap in a lower region of the back side between the flat roof and the wind deflector is formed;
   wherein a perpendicular projection of the at least one open foot gap onto a first imaginary plane, which is oriented perpendicular to the flat roof, respectively defines a second area;
   wherein the upper edge of the wind deflector and the upper edge of the PV module unit are arranged in a second imaginary plane, which is oriented parallel to the flat roof; and wherein the first area is greater than the second area, or greater than a sum of the second areas when the first and second open foot gaps are both present, for enabling a suction effect in the interior of the frame that generates a load toward the flat roof in response to wind acting on the mounting system.

2. The mounting system of claim 1, wherein the angle Beta is obtuse.

3. The mounting system of claim 1, wherein the lateral sides are substantially triangular in shape.

4. The mounting system of claim 1, wherein the lateral sides are arranged parallel to each other.

5. The mounting system of claim 1, wherein the bottom side is open.

6. The mounting system of claim 1, wherein the frame further comprises at least one of: a module support section, a set-up section, and a base section.

7. The mounting system of claim 1, wherein the PV-module unit comprises at least one of: the at least one PV module, and at least one module support section.

8. The mounting system of claim 1, wherein the PV-module unit further comprises at least one adapter plate attachable to the frame on the mounting side between the at least one PV module and the flat roof or between the at least one PV module and the ridge gap.

9. The mounting system of claim 1, wherein the ridge and foot gaps are arranged parallel to each other.

10. The mounting system of claim 1, wherein the side-covering and the wind deflector cover the sides respectively associated with the side-covering and the wind deflector, in a substantially air tight manner.

11. The mounting system of claim 1, wherein the wind deflector comprises a covering area and a spoiler, the spoiler having a spoiler area, wherein the spoiler area is arranged adjacent to the covering area and is oriented in an angle relative to the back side so that the spoiler area protrudes from the back side.

12. The mounting system of claim 11, wherein the spoiler area is oriented substantially perpendicular relative to the flat roof in the installed state of the mounting system.

13. The mounting system of claim 12, wherein an entirety of the spoiler area is oriented substantially perpendicular relative to the flat roof in the installed state of the mounting system.

* * * * *